United States Patent [19]
Wendorff

[11] Patent Number: 5,370,424
[45] Date of Patent: Dec. 6, 1994

[54] PIPE CONNECTION

[75] Inventor: Ernst Wendorff, Taunusstein, Germany

[73] Assignee: Hans-Peter Ruppert, Wiesbaden, Germany

[21] Appl. No.: 169,745

[22] PCT Filed: Aug. 23, 1991

[86] PCT No.: PCT/EP91/01598
§ 371 Date: May 4, 1992
§ 102(e) Date: May 4, 1992

[87] PCT Pub. No.: WO92/04572
PCT Pub. Date: Mar. 19, 1992

Related U.S. Application Data

[63] Continuation of Ser. No. 855,638, May 4, 1992, abandoned.

[30] Foreign Application Priority Data

Sep. 3, 1990 [EP] European Pat. Off. ......... 90116854.2

[51] Int. Cl.⁵ ............................................. F16L 33/00
[52] U.S. Cl. .................... 285/332.4; 285/334.2; 285/247; 285/249; 285/255
[58] Field of Search ............. 285/259, 332.4, 334.2, 285/382.7, 246, 247, 249, 253

[56] References Cited
U.S. PATENT DOCUMENTS

| | | | |
|---|---|---|---|
| 458,038 | 8/1891 | Rice | 285/246 |
| 1,509,484 | 9/1924 | Powell | 285/246 |
| 2,122,616 | 7/1938 | Lamont | 285/334.2 |
| 2,328,468 | 8/1943 | Laffly | 285/334.2 |
| 2,816,781 | 12/1957 | Woodling | 285/259 |
| 2,833,567 | 5/1958 | Bacher et al. | |
| 3,237,974 | 3/1966 | Press | |
| 4,369,992 | 1/1983 | Fournier et al. | 285/259 |
| 4,736,969 | 4/1988 | Fouts | 285/259 |
| 4,758,029 | 7/1988 | Davis | 285/259 |

FOREIGN PATENT DOCUMENTS

| | | | |
|---|---|---|---|
| 0380970 | 1/1990 | European Pat. Off. | |
| 1331438 | 5/1963 | France | 285/246 |
| 2253182 | 6/1975 | France | 285/247 |
| 6751209 | 9/1968 | Germany | |
| 7204515 | 2/1972 | Germany | |
| 2623157 | 11/1977 | Germany | 285/334.2 |
| 3904838 | 8/1990 | Germany | |
| 288215 | 3/1965 | Netherlands | 285/247 |
| 777859 | 6/1957 | United Kingdom | 285/246 |
| 836901 | 6/1960 | United Kingdom | 285/334.2 |

Primary Examiner—Eric K. Nicholson
Attorney, Agent, or Firm—Gifford, Groh, Sprinkle, Patmore and Anderson

[57] ABSTRACT

A connection system for a deformable conduit with a support portion which is inserted within an end of the conduit. The support portion has a hollow interior and an external contour with first and second surfaces. First and second portions of the deformable conduit are outwardly displaced by the first and second surface. A clamp assembly having an end piece and a sliding ring engage the first and second portions of the displaced conduit, respectively. A pressing portion is positioned over the clamp assembly and pinches the conduit against the support portion.

11 Claims, 2 Drawing Sheets

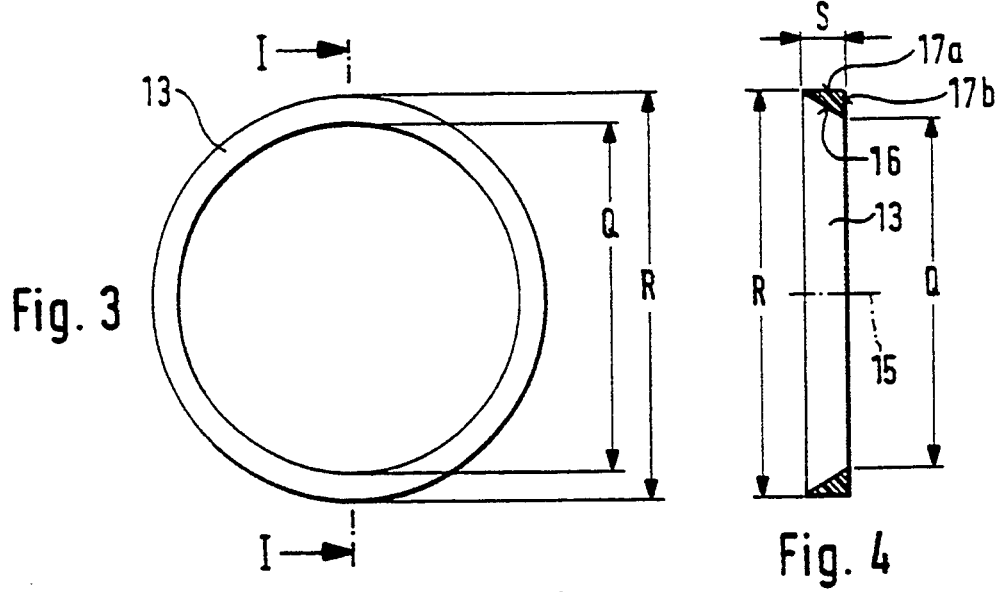
Fig. 3
Fig. 4
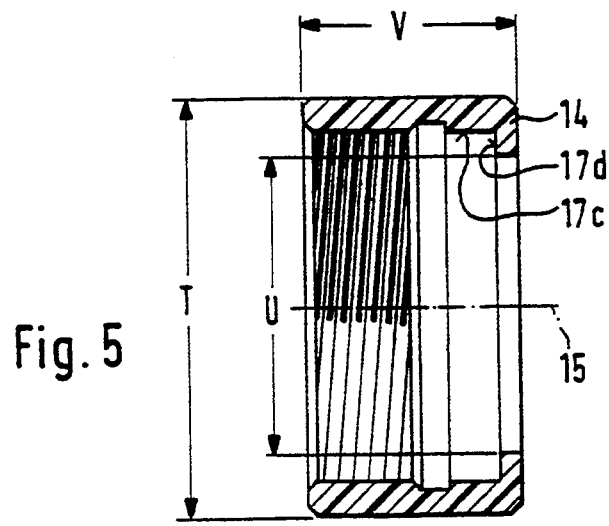
Fig. 5
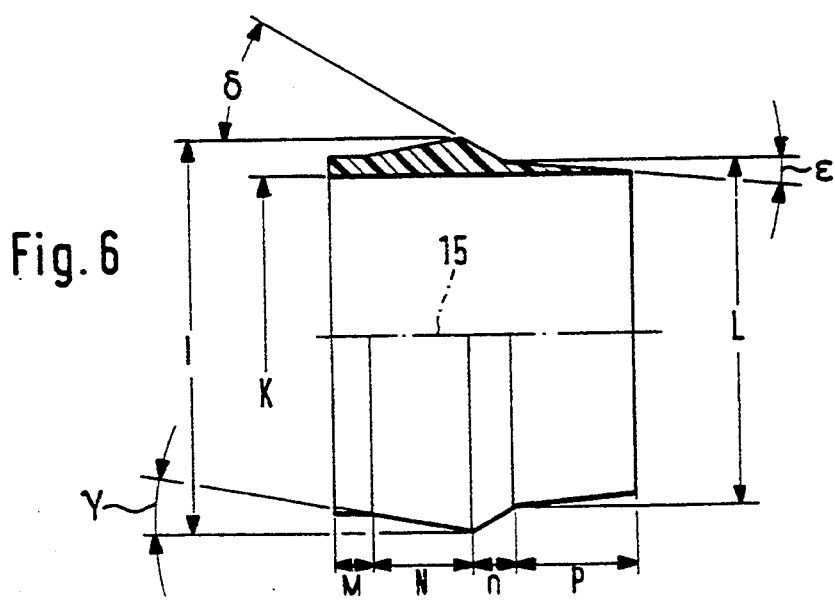
Fig. 6

PIPE CONNECTION

This is a continuation of copending application Ser. No. 07/855,638 filed on May 4, 1992, now abandoned. International Application PCT/EP91/01598 filed on Aug. 23, 1991 and which designated the U.S.

BACKGROUND OF THE INVENTION

1. Field of the Invention

The invention relates to a pipe connection, in particular for plastic pipes and hoses or the like, comprising a support portion disposed in the interior of the pipe to be connected, and a clamping means disposed on the outside of the pipe.

2. Description of the prior Art

German utility model No. 89 11 166 discloses a pipe connection comprising an externally disposed clamping means and an internally disposed support portion. The clamping means comprises a fitting and one or two one-part cap nuts. In the region of the end of the pipe the fitting is provided with an annular recess and the recess is in turn provided with a constriction or notching means. That pipe connection operates satisfactorily when substantial pressure loadings are involved and at high temperature, but leaks occur at high pressure loadings. In addition the pipe can be locally loaded by the frictional forces produced upon rotation of the cap nut or nuts, to such a degree that the resulting pressing or squeezing forces damage the pipe.

SUMMARY OF THE PRESENT INVENTION

The object of the invention is therefore that of providing a pipe connection of the kind set forth in the opening part of this specification, which ensures satisfactory sealing integrity of the pipe connection, even under high pressure loadings, and which permits the application of a higher force in assembly thereof.

That object is attained by the features in the characterizing portion of the present invention.

The projections arranged on the clamping means are pressed into the outside of the pipe to be connected upon assembly of the pipe connection, even in relation to high pressures.

The clamping means is desirably divided into a sealing portion and a pressing portion which are movable relative to each other, in accordance with the function of the clamping means of providing a satisfactory sealing effect, namely both a form-locking or positive connection and also a force-locking connection.

In an advantageous embodiment the sealing portion is of a tubular configuration and as viewed from the end of the pipe to be connected, comprises a first portion whose inside diameter approximately corresponds to that of the pipe to be connected and which is adjoined by a second portion which engages in the form of an end piece from the outside over the pipe to be connected.

The end piece is advantageously provided with a first part, as viewed from the end of the pipe to be connected, the inside diameter of said first part approximately corresponding to the outside diameter of the pipe to be connected and the first part being adjoined by a second part which has a conical enlargement in respect of its inside diameter, on which the projections are arranged.

The projections advantageously extend in an annular configuration around the end piece.

In that arrangement, a sawtooth-like configuration of the annular projections may be considered to be advantageous; particularly advantageous are undercut configurations which extend perpendicularly to the axis of the tube, and apex or crest surfaces which lie on the surface of a truncated cone, wherein the cone surfaces should preferably form an angle of about 10° to the axis of the pipe.

In order to ensure sealing integrity of the pipe connection, the invention also proposes another integer as set forth in the characterizing portion of the present invention.

Desirably the pressing portion is of a tubular configuration. In a preferred embodiment the pressing portion is provided with a sliding portion which comes to bear against the tube to be connected, with its pressing surface, and which is carried with its surfaces in a pressing portion which slides on the sliding portion.

The sliding portion is advantageously in the form of a sliding ring which has a pressing surface extending inclinedly relative to the axis of the tube, and which is disposed in the pressing portion with sliding surfaces which extend horizontally and perpendicularly to the axis of the tube.

It is considered advantageous for the sealing and pressing portions to be connected together in a force-locking manner, preferably screwably.

In order to prevent the wall of the pipe to be connected from being deflected inwardly in assembly of the pipe connection, there is advantageously disposed in the interior of the pipe a support portion which is suitably adapted to the internal profile of the clamping means, having regard to the thickness or gauge of the pipe to be connected.

The invention will be described in greater detail hereinafter by means of embodiment by way of example with reference to the accompanying drawings in which:

DESCRIPTION OF THE PREFERRED EMBODIMENT

Figure 1:
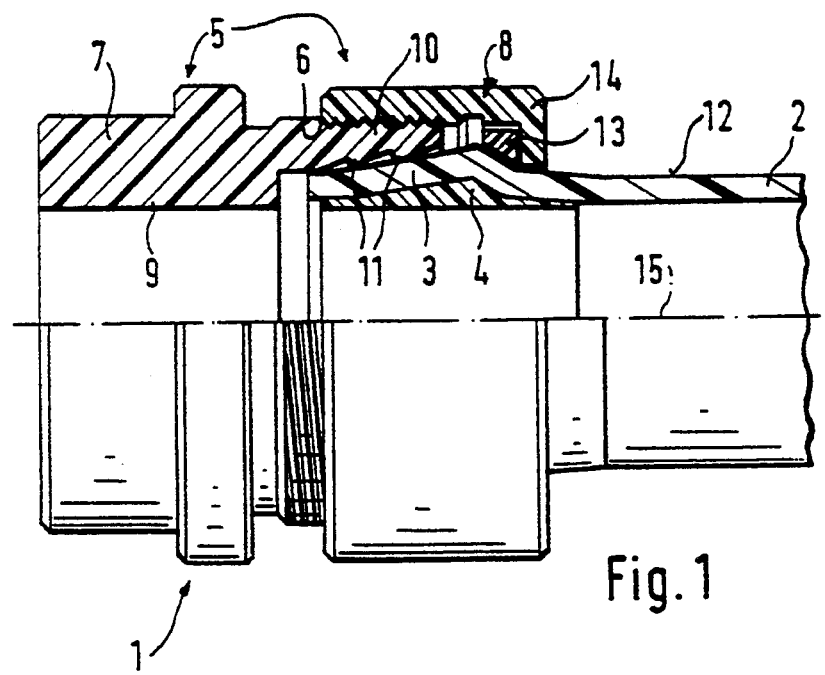
Figure 2:
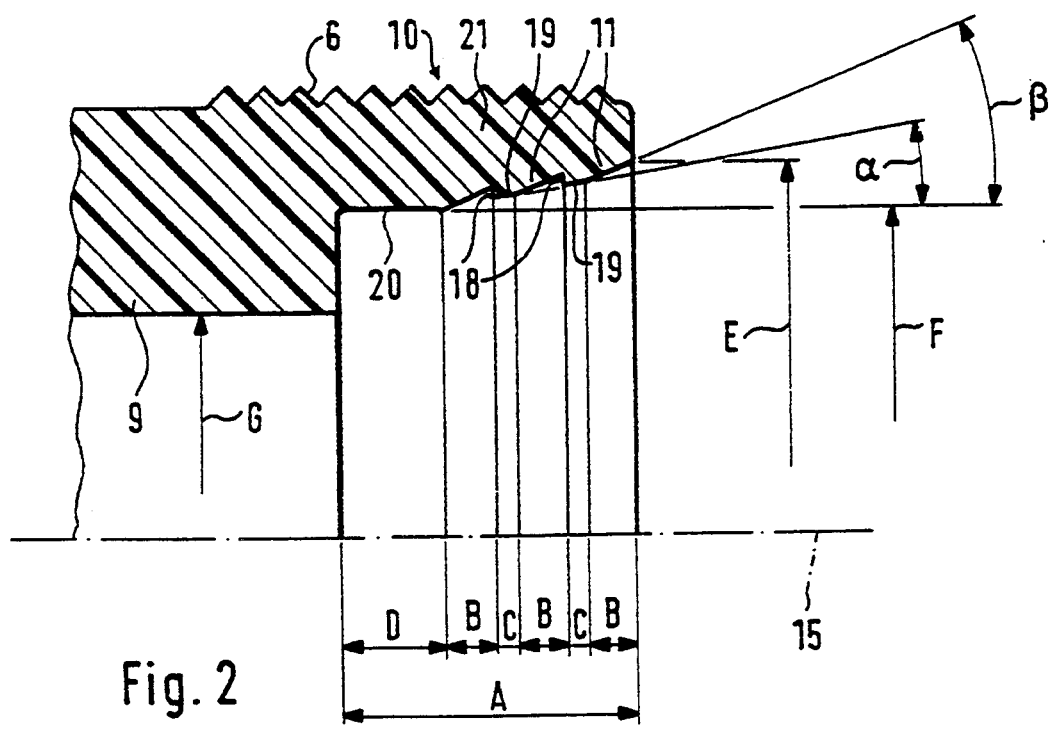

FIG. 1 shows a pipe connection with projections arranged on the sealing portion, and with a two-part pressing portion, FIG. 2 shows the end piece of a sealing portion, FIG. 3 is a view on to a sliding ring, FIG. 4 is a view in section taken along line I—I in FIG. 3, FIG. 5 shows a pressing portion, and FIG. 6 shows a support portion.

FIG. 1 shows a pipe connection which is generally identified by reference numeral 1 and in which a plastic pipe 2 is pushed in the region of its end 3 to be connected over a support portion 4. Provided on the pipe on the outside thereof is a clamping means 5 comprising a sealing portion 7 which is provided with an external screwthread 6 and on to which a pressing portion 8 is screwed. The sealing portion 7 comprises a first portion 9 whose inside diameter G corresponds to that of the pipe 2 to be connected and a second portion, an end piece 10, which engages from the outside over the pipe 2 to be connected. Arranged on the end piece 10 are projections 11 which press into the outside surface 12 of the pipe 2 to be connected. The pressing portion 8 comprises a sliding portion 13 and a pressing portion 14. The sliding portion 13 is in the form of a sliding ring and has a pressing surface 16 which extends inclinedly relative to the axis 15 of the pipe and sliding surfaces 17a and 17b which extend level and perpendicularly to the axis 15 of the pipe. The pressing portion 14 is of a tubular configuration and bears against the sliding surfaces 17a and 17b of the sliding ring 13. The pressing portion 14 is therefore not in direct contact with the pipe 2 to be connected. Disposed in the interior of the pipe is the support portion 4 which is adapted to the internal contour of the clamping means 5.

FIG. 2 is a diagrammatic view of the end piece 10 of the sealing portion 7; the end piece 10 engages over the pipe from the outside. The projections 11 are arranged on the conical enlargement 21 of the end piece 10. The pressure of the projections on the outside surface 12 of the pipe 2 to be connected affords sealing integrity of the pipe connection 1. The projections 11 are of a sawtooth-like configuration, by virtue of the fact that they are formed by undercut configurations 18 which extend at a right angle to the axis of the pipe, while their apex or crest surfaces 19 lie on the surface of a truncated cone. The specific configuration of the sealing portion 7, depends on the outside diameter of the tube 2 to be connected and its wall thickness. That also applies in regard to the specific configurations of the sliding portions 13, the pressing portion 14 and the support portion 4. For example, the following dimensions are advantageous for a tube with an outside diameter of 40 mm and a wall thickness of 3.7 mm: A=17 mm, B=3 mm, C=2 mm, D=4 mm, E=47.5 mm, F=42 mm, G=32.6 mm, $\alpha =10°$ and $\beta =22°$.

FIG. 3 is a plan view of a sliding ring 13 which, as can be seen from FIG. 4 is of triangular cross-section. The sliding ring 13 is carried in the pressing portion 4 with the outwardly disposed sliding surface 17a and a sliding surface 17b which is arranged perpendicularly thereto in the axial direction, and, in the operative position, comes to bear against the pipe to be connected, with the pressing surface 16 which extends inclinedly, as can be seen from FIG. 4. That makes it possible to apply a high pressing force in order thereby to increase the sealing effect. In particular that arrangement provides that the sliding ring rests non-slidably on the pipe to be connected and there is no friction between the pipe and the sliding ring, whereas the relative movement occurs between the sliding surfaces 17a and 17b of the sliding ring 13 and the pressing portion 14. For a pipe with an outside diameter of 40 mm and a wall thickness of 3.7 mm, the advantageous dimensions for the sliding ring are as follows: outside diameter R=49 mm, inside diameter Q=42.5 mm, radial extent S=7 mm, resulting in an inclinedly extending pressing surface 16 of about 30° relative to the axis of the pipe.

FIG. 5 is a view in greater detail of the pressing portion 14. The pressing portion 14 has sliding surfaces 17c and 17d corresponding to the sliding surfaces 17a and 17b of the sliding ring 13 so that, during assembly of the pipe connection 1, the surfaces 17a, 17c and 17b, 17d respectively of the sliding ring 13 and the pressing portion 14 slide against each other. The advantageous dimensions for the above-mentioned pipe, for the pressing portion 14, are as follows: outside diameter T=60 mm, inside diameter of the radial passage U=22 mm, and the overall radial length V=28 mm.

FIG. 6 is a diagrammatic view of the support portion 4 which is disposed in the interior of the pipe. Its inside diameter K corresponds to that of the pipe 2 to be connected while its external contour is adapted to the respective internal contour of the clamping means 5. For the selected embodiment with a pipe diameter of 40 mm and a pipe wall thickness of 3.7 mm, the following dimensions have proven to be advantageous: I=40 mm, K=32.6 mm, L=35 mm, M=2 mm, N=12.25 mm, O=4.5 mm, P=11.5 mm, $\psi =10°$, $\delta =30°$, $\epsilon =5°$.

The present invention therefore provides two arrangements which, in a pipe connection, as mentioned in the opening part of this specification, substantially improve the sealing effect involved. The arrangements in question may readily be applied to pipes of different dimensions, as indicated.

I claim:

1. A pipe connection for flexible conduits, comprising:
   a support portion inserted entirely within the flexible conduit to be connected, said flexible conduit having a deformable end portion, said support portion having an interior diameter corresponding in dimension to an inner diameter of the flexible conduit, said support portion further having an external contour formed by first and second surfaces which displaces outwardly said deformable end portion of said flexible conduit, said first surface extending at a first predetermined angle with respect to the axis of the pipe;
   clamping means disposed exteriorly of said flexible conduit, said clamping means including an end piece, said end piece having an internal surface which is contoured to match the contour of said first surface of said external contour of said support portion;
   a plurality of projections extending from said internal surface of said end piece, each of said projections having a first portion extending at generally said predetermined first angle relative to a longitudinal axis of the pipe, each of said projections further having a second portion extending beyond said first portion at a second angle relative to the axis of the pipe which is greater than the first angle, the displaced flexible conduit engaging only against said first extending portions of said projections;
   said clamping means further including a sliding ring also disposed exteriorly of said flexible conduit, said sliding ring pinching a second portion of conduit which is displaced by said second surface of said external contour, and
   a pressing portion which is secured over said end piece and said sliding ring of said clamping means, said pressing portion and said clamping means pinching said outwardly displaced conduit against said support portion;
   whereby said conduit of said support portion is maintained during high pressure loadings so that fluid leaks and damage to the conduit is avoided.

2. The pipe connection according to claim 1, wherein the clamping means includes a sealing portion, said sealing portion and said pressing portion are movable relative to each other.

3. The pipe connection according to claim 2, wherein the sealing portion is tubular and, as viewed from an end of the pipe to be connected, has a first portion whose inside diameter corresponds to that of the pipe to be connected and which adjoins said end piece from the outside over the pipe to be connected.

4. The pipe connection according to claim 3, wherein, as viewed from the end of the pipe to be connected, the end piece comprises a first part whose inside diameter corresponds to the outside diameter of the pipe to be connected, and is adjoined by a second part which has a conical enlargement in its inside diameter on which the projections are arranged.

5. The pipe connection according to claim 4, wherein the projections extend on the end piece in an annular configuration therearound.

6. The pipe connection according to claim 5, wherein the annular projections are of a sawtooth-like configuration, in that they are formed by undercut configurations which extend perpendicularly to the axis of the pipe, said first portions of said protrusions lie in a frusto-conical surface which extends inwardly towards the end of the pipe to be connected.

7. The pipe connection according to claim 6, wherein the conical surface is at an angle of about 10° relative to the axis of the pipe to be connected.

8. The pipe connection according to claim 1, wherein the pressing portion, which is preferably of a tubular configuration is provided with said sliding ring which comes to bear against the pipe to be connected, with its pressing surface, while with its sliding surfaces said ring is carried in said pressing portion which slides over the sliding ring.

9. The pipe connection according to claim 8, wherein the sliding ring pressing surface extends inclinedly relative to an axis of the pipe and is carried in the pressing portion with the sliding surfaces extending level and perpendicularly to the pipe axis.

10. The pipe connection according to claim 1, wherein said clamping means further comprises a sealing portion extending from said end piece, the pressing portion being screwably engaged around said end piece so as to be connected to said sealing portion.

11. The pipe connection according to claim 1, wherein in the interior of the pipe, said support portion is suitably adapted to the internal profile of the clamping means, and the thickness of the pipe to be connected.

* * * * *